United States Patent
Joyce et al.

(10) Patent No.: US 9,428,226 B2
(45) Date of Patent: *Aug. 30, 2016

(54) MAGNETIC VEHICLE ATTACHMENT SYSTEM FOR USE WITH NON-MAGNETIC BODY STRUCTURE

(75) Inventors: John Joyce, Westland, MI (US); Todd Jared Konet, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/536,233

(22) Filed: Jun. 28, 2012

(65) Prior Publication Data

US 2014/0001322 A1     Jan. 2, 2014

(51) Int. Cl.
| | |
|---|---|
| *A47G 1/17* | (2006.01) |
| *B62D 27/06* | (2006.01) |
| *B62D 25/06* | (2006.01) |
| *B60R 13/02* | (2006.01) |

(52) U.S. Cl.
CPC ............ *B62D 27/06* (2013.01); *B60R 13/0206* (2013.01); *B60R 13/0218* (2013.01); *B62D 25/06* (2013.01)

(58) Field of Classification Search
CPC   B60R 13/02; B60R 13/0212; B60R 13/0206; B60R 13/0231; B60R 13/0225; B60R 13/0218; A44D 2303/00; A44D 2203/00; Y10T 24/32; F16B 5/12; B62D 27/06; B62D 25/06
USPC ........ 248/206.5, 309.4, 27.3, 229.16, 229.26, 248/228.7, 230.7, 231.81, 316.7, 223.31, 248/223.21, 683, 647, 537; 296/191, 1.088, 296/214, 216.06, 216.07, 216.08, 216.09, 296/146.7, 1.08, 39.1; 24/303, 581.11, 297, 24/453, 458; 52/506.01, 506.05, 506.06, 52/716.5, 716.6, 716.7
See application file for complete search history.

(56) References Cited

U.S. PATENT DOCUMENTS

| | | | |
|---|---|---|---|
| 2,009,648 A | 11/1937 | Hall | |
| 2,099,649 A | 11/1937 | Hall | |
| 2,876,359 A | 3/1959 | Plymale | |
| 3,361,404 A | 1/1968 | Lohr | |
| 3,365,684 A | * 1/1968 | Stemke | ................. H01F 7/0252 160/349.2 |
| 3,378,974 A | 4/1968 | Bush, Jr. | |

(Continued)

FOREIGN PATENT DOCUMENTS

| | | | |
|---|---|---|---|
| GB | 1056797 | * | 1/1967 |
| JP | 2007232199 A | | 9/2007 |
| JP | 2009220648 A | | 10/2009 |

OTHER PUBLICATIONS http://www.nims.go.jp/apfim/soft&hard.html; date of access Feb. 4, 2015.*

(Continued)

*Primary Examiner* — Christopher E Garft
(74) *Attorney, Agent, or Firm* — Vichit Chea; Price Heneveld LLP

(57) ABSTRACT

A vehicle headliner attachment system for mounting a headliner to a non-magnetic roof structure includes a headliner with an interior and an exterior surface, a magnet affixed to the exterior surface of the headliner, and a ferromagnetic clip mounted to the non-magnetic roof structure. The magnet and the ferromagnetic clip enable magnetic attachment of the headliner to the non-magnetic roof structure.

18 Claims, 7 Drawing Sheets

(56) References Cited

U.S. PATENT DOCUMENTS

| | | | |
|---|---|---|---|
| 3,651,796 A | 3/1972 | Nelson | |
| 3,895,332 A | 7/1975 | Box | |
| 3,953,067 A * | 4/1976 | Isola | B60R 13/0206 296/214 |
| 3,982,370 A * | 9/1976 | Buffington | E04B 2/7457 52/481.2 |
| 4,095,837 A | 6/1978 | Hunter | |
| 4,317,589 A | 3/1982 | Kuss | |
| 4,835,923 A | 6/1989 | Ybarra | |
| 4,838,004 A * | 6/1989 | Adell | E04F 19/026 293/128 |
| 4,934,119 A | 6/1990 | Ybarra | |
| 5,186,517 A * | 2/1993 | Gilmore | B60R 11/00 24/295 |
| 5,269,060 A * | 12/1993 | Dowd | B60J 3/0208 29/453 |
| 5,280,991 A | 1/1994 | Weiland | |
| 5,353,571 A * | 10/1994 | Berdan | B60R 13/04 24/293 |
| 6,305,656 B1 * | 10/2001 | Wemyss | A47G 23/0216 206/5 |
| 7,306,190 B2 | 12/2007 | Tisol, Jr. | |
| 7,677,653 B2 * | 3/2010 | Brown | B60R 13/0206 296/214 |
| 8,042,308 B2 | 10/2011 | Sullivan et al. | |
| 8,272,613 B2 * | 9/2012 | Golle | F16B 5/0642 248/300 |
| 8,398,161 B2 * | 3/2013 | Kirchen | B60R 13/0231 296/214 |
| 8,434,730 B2 * | 5/2013 | Ahlstrom | A47G 1/168 248/206.5 |
| 2002/0130231 A1 | 9/2002 | Winnard | |
| 2004/0202797 A1 * | 10/2004 | Ginder | H01F 41/16 427/598 |
| 2009/0211065 A1 | 8/2009 | Moerke | |
| 2010/0289288 A1 | 11/2010 | Smith et al. | |
| 2011/0083254 A1 | 4/2011 | Trutna et al. | |
| 2011/0140474 A1 | 6/2011 | Smith et al. | |
| 2011/0169295 A1 * | 7/2011 | Huelke | F16B 5/0628 296/97.11 |
| 2012/0061998 A1 * | 3/2012 | Carsley | B62D 25/06 296/210 |
| 2012/0069587 A1 * | 3/2012 | Holland | F21S 4/10 362/396 |
| 2012/0126583 A1 * | 5/2012 | Brown | B60R 13/0231 296/210 |
| 2013/0285419 A1 * | 10/2013 | Lizak | B60R 13/0206 296/214 |

OTHER PUBLICATIONS

Glossary of automotive design.*
Edge definition from www.merriam-webster/com/dictionary/edge.*
U.S. Appl. No. 13/536,215, filed Jun. 28, 2012, filing receipt (3 pages), patent application and drawings (14 pages).

* cited by examiner

MAGNETIC VEHICLE ATTACHMENT SYSTEM FOR USE WITH NON-MAGNETIC BODY STRUCTURE

FIELD OF THE INVENTION

The present invention generally relates to a system for attaching a trim component to a vehicle body structure, and more particularly for magnetically attaching a headliner to a non-magnetic vehicle roof.

BACKGROUND OF THE INVENTION

The body structure of a vehicle roof typically includes a roof panel and several roof headers and bows, which are closed-section or channel-shaped structures secured to the vehicle body. Roof headers and bows extend along the length and across the width of the vehicle roof to provide support for the roof panel. The roof panels, headers, and bows are commonly fabricated from stamped sheet metal. A headliner is attached to the interior side of roof structure to provide an attractive appearance for the interior of the vehicle. Headliners have been attached to the roof of vehicles in a variety of manners, including using screw or snap-in fasteners, adhesives, magnets, and hook and loop type fasteners, such as VELCRO.

Recently, an interest in reducing the weight of a vehicle has led manufactures to use lighter materials, such as aluminum, for vehicle roof panels, headers, and bows. Using aluminum eliminates the ability to magnetically attach components to the roof structure because aluminum is not magnetically attachable.

SUMMARY OF THE INVENTION

One aspect of the present invention includes a vehicle headliner attachment system for mounting a headliner to a non-magnetic roof structure. The attachment system includes a headliner with an interior and an exterior surface, a magnet affixed to the exterior surface of the headliner, and a ferromagnetic clip mounted to the non-magnetic roof structure. The magnet and the ferromagnetic clip enable magnetic attachment of the headliner to the non-magnetic roof structure.

Another aspect of the present invention includes a vehicle attachment system for mounting a trim component to a non-magnetic body structure. The attachment system includes the trim component, a magnet affixed to one of the trim component and the body structure, and a ferromagnetic clip mounted to the other of the trim component and the body structure. The magnet and the magnetic clip enable magnetic attachment of the trim component to the non-magnetic body structure.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
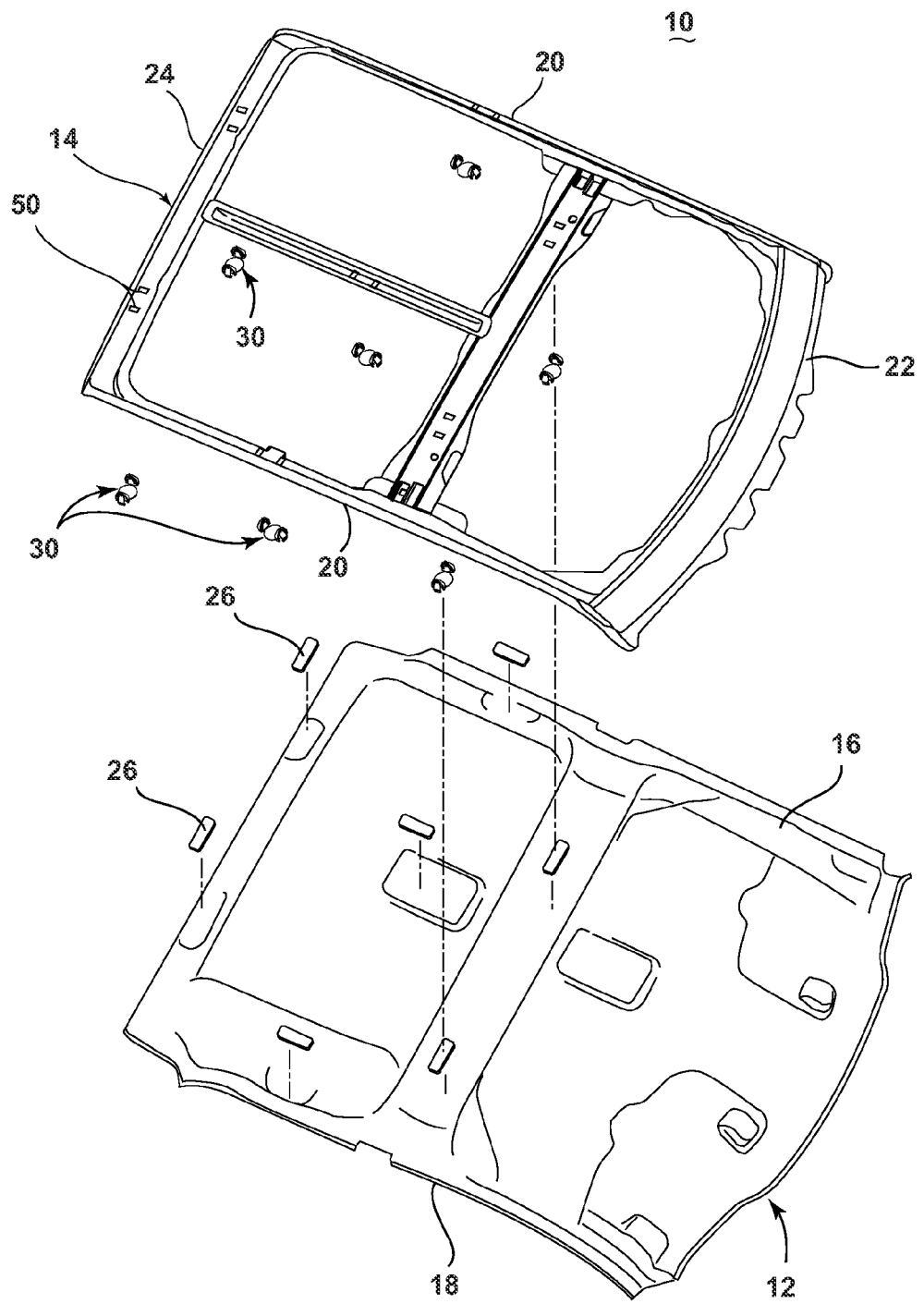
FIG. 1 is a top perspective, exploded view of a vehicle attachment system, according to one embodiment.

For purposes of description herein, the terms "upper," "lower," "right," "left," "rear," "front," "vertical," "horizontal," "interior," "exterior," and derivatives thereof shall relate to the vehicle attachment system as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, reference numeral 10 generally designates a vehicle attachment system for mounting a trim component 12, such as a headliner, to a non-magnetic body structure 14 of an automotive vehicle. In the illustrated embodiments, the trim component 12 is shown in the form of a headliner; however, other trim components, including pillar trim, interior panels, and the like are contemplated according to other embodiments. Further, the body structure 14 is shown in the form of a roof structure; however, other body structures, including pillars, body panels, and the like are contemplated.

The headliner 12 may be a formed and molded headliner for mounting to the interior of the roof structure 14 of the vehicle, so as to provide an aesthetically pleasing appearance for the interior thereof. The headliner 12 has an exterior surface 16 which faces the supporting roof structure 14 when installed in the vehicle, and an opposite, interior surface 18 that is upholstered to provide a decorative surface visible from the interior of the vehicle. The headliner 12 is shaped to conform to the roof structure 12 and may include a plurality of contours and apertures for mounting various overhead components, such as sunvisors, overhead consoles, grab handles, lights, and the like. The roof structure 14 includes a pair of spaced side rails 20, and at least a front header 22, a rear header, 24, and may also include additional roof bows, as is conventional. The roof structure 14 is formed of non-magnetic material, such as aluminum, or any other suitable material.

The headliner attachment system 10 further includes a magnet 26, affixed to the exterior surface 16 of the headliner 12. The magnet 26 is made of a material that has its own persistent magnetic field, even in the absence of an applied magnetic field. Examples of such types of magnetic metals include iron ore, cobalt, and nickel. In the illustrated example, a plurality of magnets 26 is spaced about the exterior surface 16 of the headliner 12. The magnets 26 can be bonded to the surface 16 by a layer of hot melt adhesive (not shown). Of course, other glues, adhesives, or means of attaching the magnets 26 to the headliner 12 are also feasible.

Figure 2:
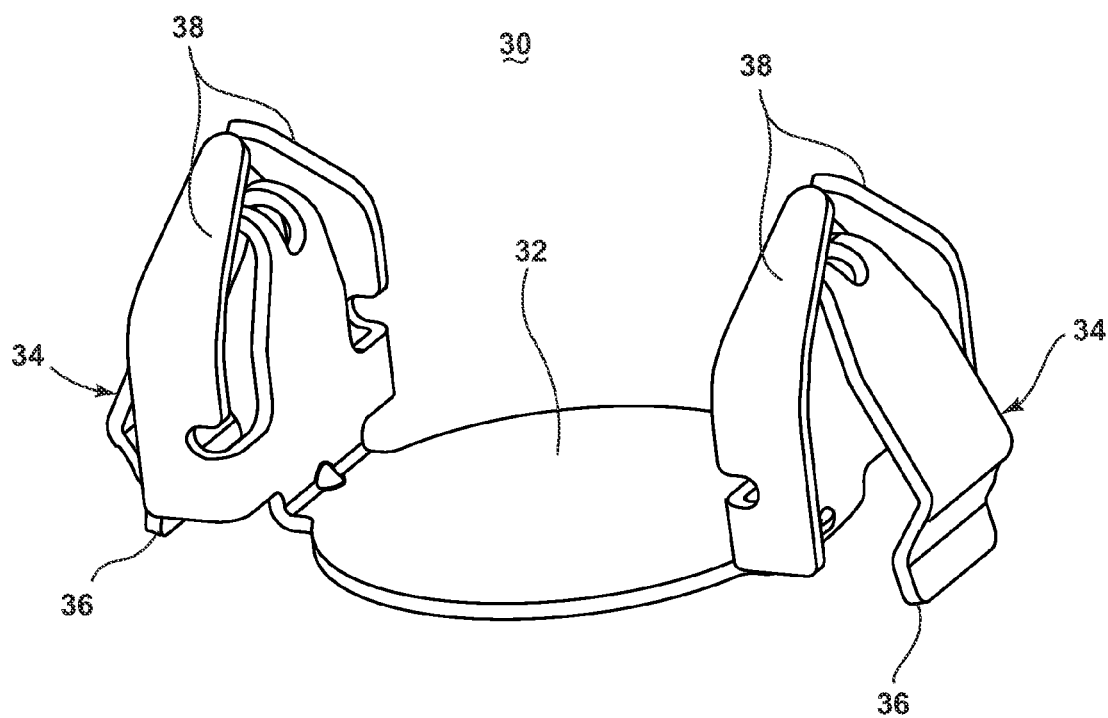
FIG. 2 is a top perspective view of a ferromagnetic clip of the vehicle attachment system of FIG. 1.

Referring now to FIG. 2, the headliner attachment system 10 also includes a ferromagnetic clip 30, which has a main body 32 and at least two upstanding spring clips 34. In the illustrated exemplary clip 30, the body 32 is shown as being circular, however other geometries are also contemplated. The spring clips 34 are integrally formed in the clip 30, and are generally disposed in spaced relationship at the periphery of the body 32. The spring clips 34 each include a spring leg 36 and lead-ins 38. The clips 30 can be formed of any suitable ferromagnetic material, metal, metal alloy, or any other suitable material that is capable of attracting a magnet. Alternatively, the clips 30 can be formed of a magnetic metal having a reverse polarity with respect to the magnet 26.

Figure 3:
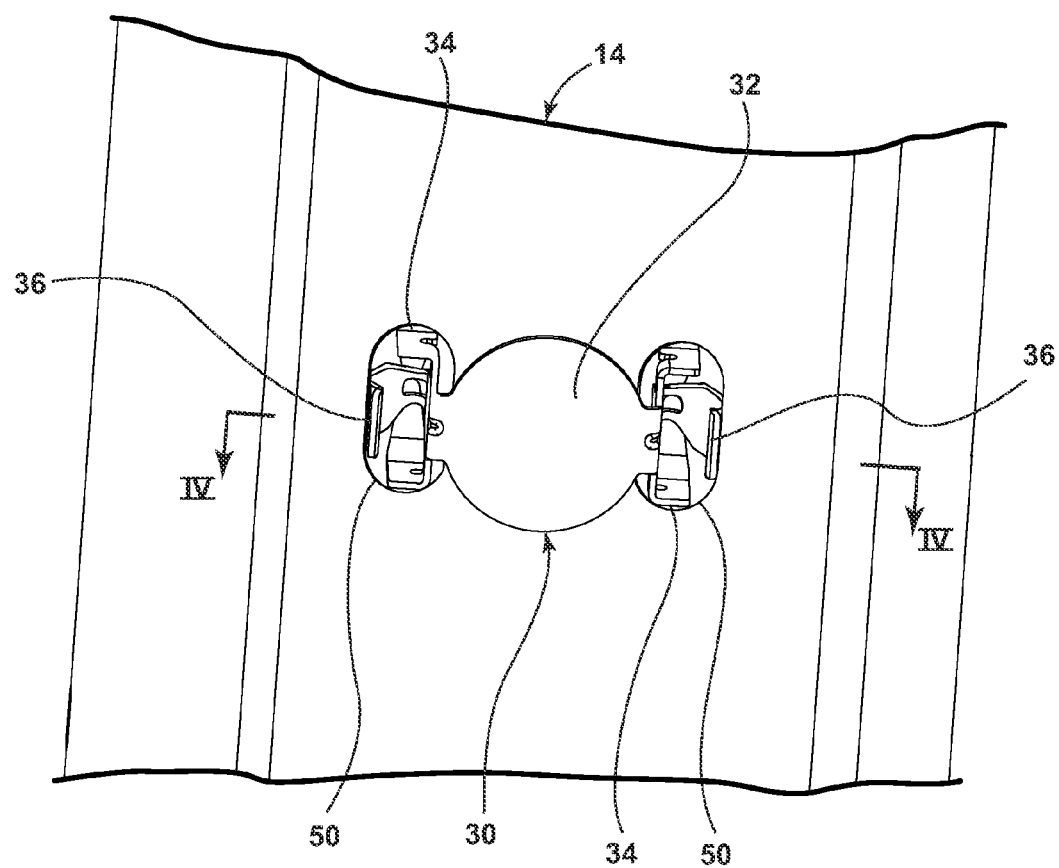
FIG. 3 is a bottom view of the ferromagnetic clip inserted into a vehicle body structure of the vehicle attachment system of FIG. 1.
Figure 4:
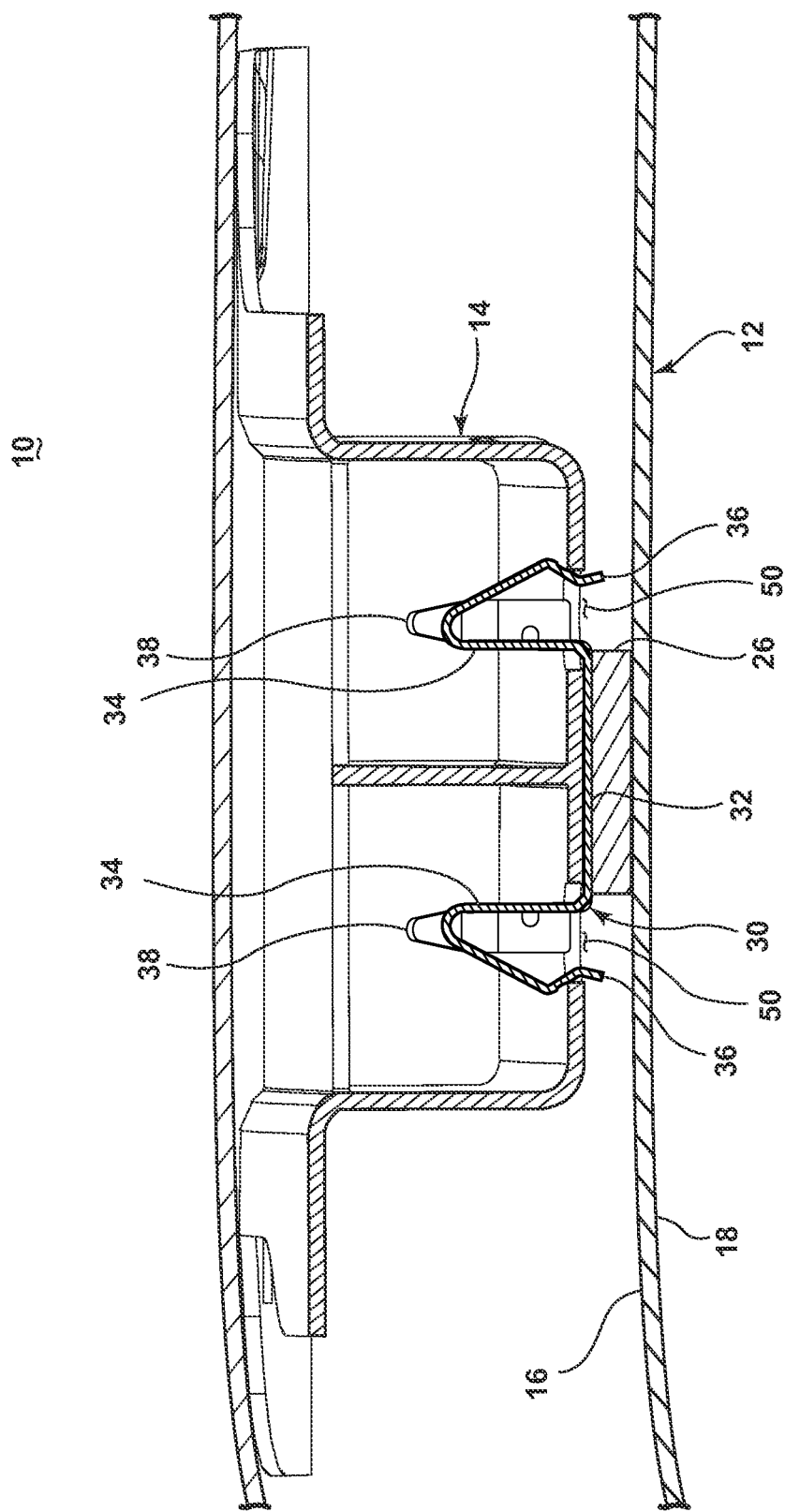
FIG. 4 is a cross-sectional side view taken along line IV-IV of FIG. 3.

Referring to FIGS. 3 and 4, the roof structure 14, including the side rails 20, and front and rear headers 22 and 24, includes at least two spaced apertures 50. In the illustrated example, the roof structure 14 includes a plurality of apertures 50 disposed therealong. The apertures 50 are oriented in pairs such that a clip 30 can be installed into the paired apertures 50. The spring clips 34 of each ferromagnetic clip 30 are inserted into the apertures 50, flexing the biased spring legs 36. The lead-ins 38 help guide the spring clips 34 into the apertures 50. Once fully installed, the spring legs 36 snap back to their original positions and retain the clip 30 to the roof structure 14, whether it be the side rail 20, front or rear header 22, 24. In this manner, the ferromagnetic clips 30 are mounted to the non-magnetic roof structure 14.

The headliner 12, with the magnets 26 bonded to the exterior surface 16 thereof, is installed during assembly of the vehicle. The magnets 26 and clips 30 are located on the headliner 12 and roof structure 14, respectively, so that they are aligned when the headliner 12 is installed on the vehicle. When the headliner 12 is positioned in general alignment for installation, the magnets 26 will be attracted to the ferromagnetic clips 30 clipped into the non-magnetic roof structure 14, thereby enabling magnetic attachment of the headliner 12 to the non-magnetic roof structure 14. Further, the particular magnet 26 selected for use can be based on the material's magnetic magnitude, which describes how strong the magnetic attraction is. The magnets 26 must be able to attract the clips 30 with sufficient force so as to secure the headliner 12 to the non-magnetic roof structure 14 and stay secure during normal use of the vehicle.

Figure 5:
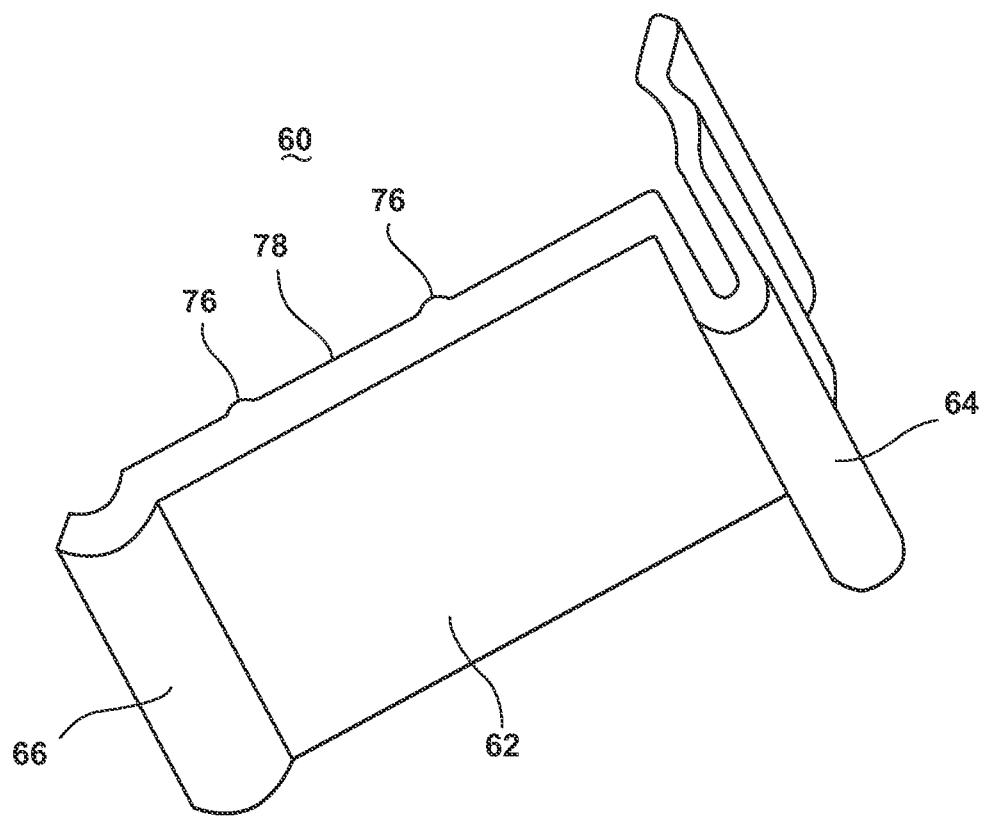
FIG. 5 is a bottom perspective view of a ferromagnetic plate of a vehicle attachment system, according to another embodiment.
Figure 6:
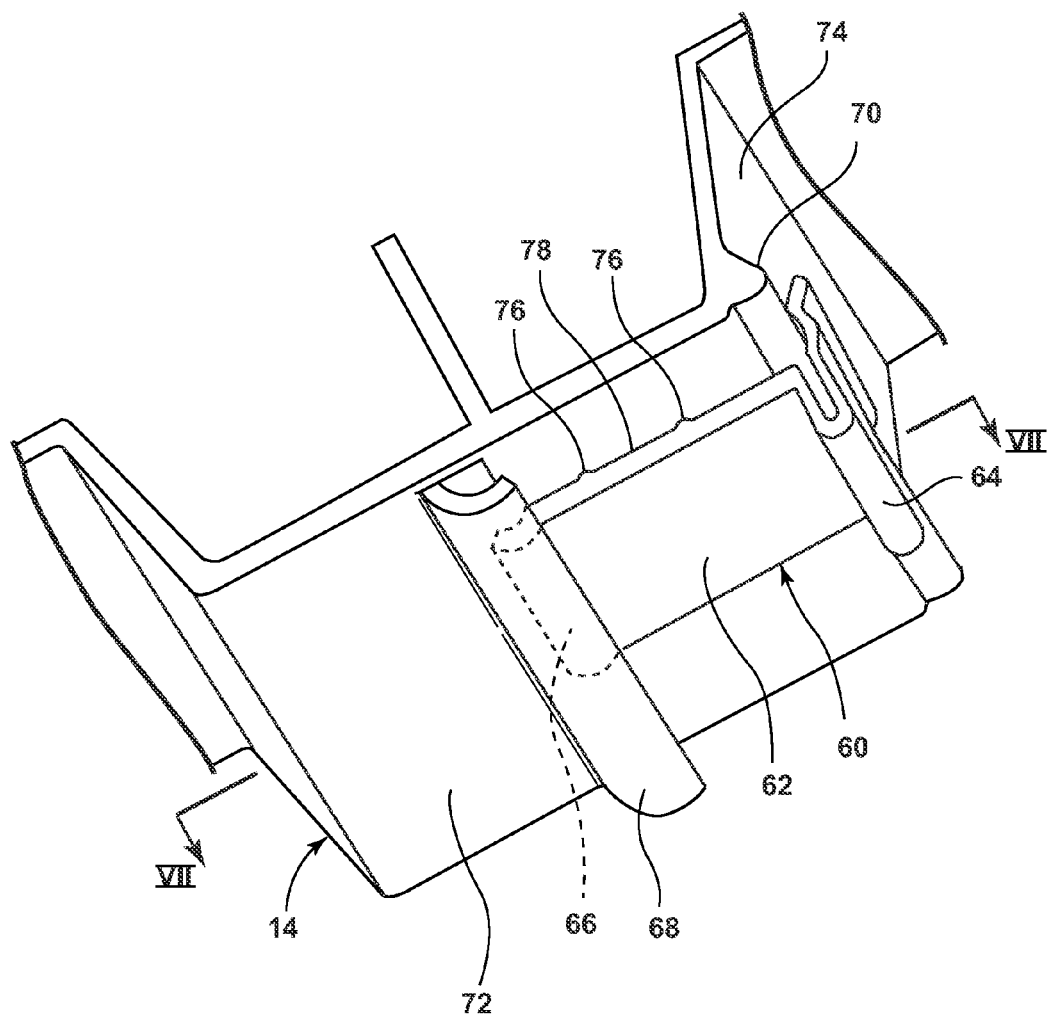
FIG. 6 is a bottom perspective view of the ferromagnetic plate mounted to a vehicle body structure of the vehicle attachment system of FIG. 5.
Figure 7:
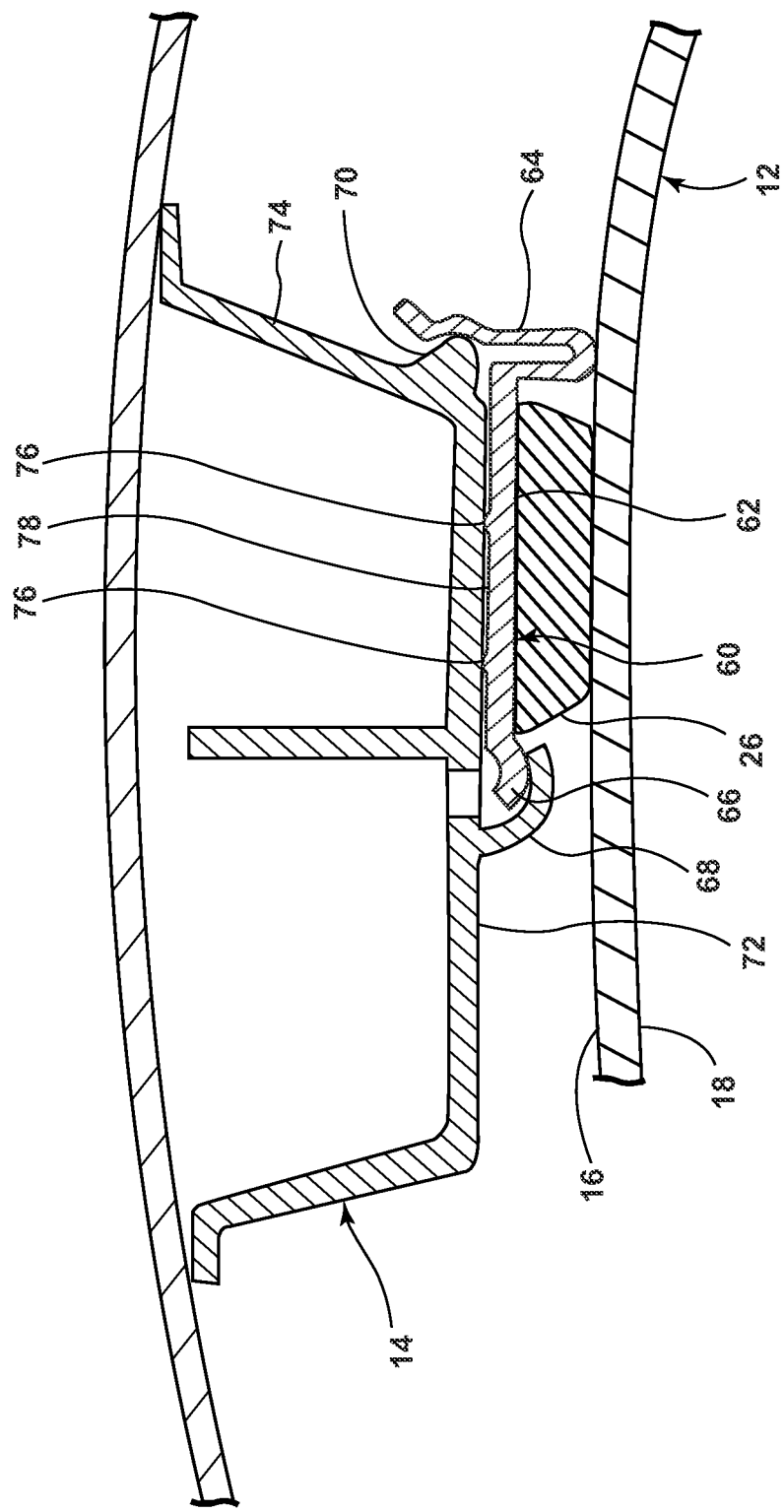
FIG. 7 is a cross-sectional side view taken along line VII-VII of FIG. 6.

FIGS. 5-7 illustrate a second embodiment of the headliner attachment system 10 where similar elements from the first embodiment are labeled with the same reference numerals. The headliner attachment system 10 of the second embodiment includes a ferromagnetic plate 60 in place of the ferromagnetic clip 30 of the first embodiment. Referring to FIG. 5, the ferromagnetic plate 60 has a main body 62, a spring arm 64, and a retention tab 66. In the illustrated exemplary plate 60, the body 62 is illustrated as being a generally flat, rectangular member, however other geometries are contemplated. The spring arm 64 and retention tab 66 are located at opposite ends of the body 62. Additionally, the plate 60 can be formed of any suitable ferromagnetic material, metal, metal alloy, or any other suitable material that is capable of attracting a magnet. Further, the plate 60 can be formed of a magnetic metal having a reverse polarity with respect to the magnet 26.

Referring to FIGS. 6 and 7, the roof structure 14 includes a slot 68 and a ledge 70. The slot 68 is a curved undercut that is machined or otherwise formed into a lower surface 72 of the roof structure 14, including the side rails 20, and front and rear headers 22 and 24. The ledge 70 is a protrusion that is formed in a side surface 74 of the roof structure 14. The slot 68 and ledge 70 enable the ferromagnetic plate 60 to be mounted to the roof structure 14. Specifically, the retention tab 66 is inserted into and retained by the slot 68, and the spring arm 64 is installed over the ledge 70, thereby retaining the ferromagnetic plate 60 to the non-magnetic roof structure 14. As shown, the roof structure 14 may include a plurality of slots 68 and ledges 70 oriented and formed in pairs for mounting a plurality of plates 60 thereto.

Additionally, the plate 60 includes several nubs 76, located on an upper surface 78 of the main body 62. The nubs 76 interface with the lower surface 72 of the roof structure 14, such that potential rattle between the plate 60 and the roof structure 14 is reduced or eliminated.

The headliner 12, with the magnets 26 bonded to the exterior surface 16 thereof, is installed in the same manner as described above with respect to the first embodiment. The magnets 26 attract the ferromagnetic plate 60 mounted to the non-magnetic roof structure 14, thereby enabling magnetic attachment of the headliner 12 to the non-magnetic roof structure 14.

It should easily be understood by one having ordinary skill in the art that the magnetic properties of the clips 30 (or plate 60) and the magnets 26 could be switched, according to another embodiment. In other words, the clips 30 and plates 60 could be made of a magnetic material, while the member that is the magnet 26 could be made of a ferromagnetic material. Additionally, as mentioned above, both the clips 30 and plate 60 could be formed of a magnetic metal as long as the polarity is reversed with respect to the magnet 26. In each of these described variations of component orientation, the headliner 12 is able to be mounted to the non-magnetic roof structure 14 by magnetic force.

With the industry-wide transition to lighter materials, which are often not magnetic, take aluminum for example, the ability to magnetically attach components to the vehicle body is lost. The vehicle attachment system 10 described herein enables magnetic attachment of a trim component, such as a headliner, to a non-magnetic body structure, such as an aluminum roof structure. Additionally, the vehicle attachment system 10 also provides an attachment means that does not have fasteners that are visible from within the vehicle's interior, which is a perceived craftsmanship improvement. Another benefit the vehicle attachment system 10 provides is the ease with which the headliner 12 can be blindly installed to the roof structure 14. Installation of the headliner 12 is considered to be a "blind" installation because the installer is not able to view the fasteners during installation.

It will be understood by one having ordinary skill in the art that construction of the described headliner attachment system and other components is not limited to any specific material. Other exemplary embodiments of the invention disclosed herein may be formed from a wide variety of materials, unless described otherwise herein.

It is also important to note that the construction and arrangement of the elements of the headliner attachment system as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A vehicle headliner attachment system comprising:
    a headliner having interior and exterior surfaces;
    a magnet affixed to the exterior surface;
    a non-magnetic roof structure having a hollow structural member with two apertures extending through a bottom wall thereof; and
    a ferromagnetic clip having a central planar body extending along a longitudinal axis, said planar body magnetically attached to the magnet and extending between two self-retaining upstanding spring clips separately retained in the two apertures to secure the headliner to the non-magnetic roof structure, wherein the spring clips are disposed at opposing terminal edges of the ferromagnetic clip, and wherein the spring clips are operable in opposing directions along the longitudinal axis.

2. The vehicle headliner attachment system of claim 1, wherein the two self-retaining upstanding spring clips are each biased against a periphery of the two apertures in the bottom wall.

3. The vehicle headliner attachment system of claim 2, wherein the two apertures in the roof structure are spaced apart for the central planar body of the ferromagnetic clip to abut the bottom wall between the two apertures.

4. The vehicle headliner attachment system of claim 3, wherein the attachment system comprises a plurality of magnets spaced about the exterior surface of the headliner and a plurality of ferromagnetic clips spaced about the roof structure.

5. The vehicle headliner attachment system of claim 4, wherein the ferromagnetic clips attract the magnets with sufficient magnitude so as to secure the headliner to the non-magnetic roof structure.

6. The vehicle headliner attachment system of claim 5, wherein the ferromagnetic clips are magnetic and oriented in reverse polarity with respect to the magnets.

7. A vehicle trim component attachment system comprising:
    a magnet affixed to a trim component exterior surface;
    a non-magnetic structure having a pair of spaced apertures extending through an interior wall thereof; and
    a ferromagnetic clip having a planar body magnetically attached to the magnet and a pair of spring clips operable along a longitudinal axis of the planar body and protruding from terminal ends thereof to extend through and snap into the spaced apertures.

8. The vehicle trim component attachment system of claim 7, wherein the pair of spring clips each have a spring leg biased against a periphery of the pair of spaced apertures for retaining the ferromagnetic clip to the non-magnetic body structure.

9. The vehicle trim component attachment system of claim 7, wherein the pair of spring clips engage outer edges of the pair of spaced apertures.

10. The vehicle trim component attachment system of claim 9, wherein the non-magnetic structure includes at least one of a header and a side rail that span along the non-magnetic structure to define a portion of a roof structure.

11. The vehicle trim component attachment system of claim 7, wherein the pair of spring clips are retained by the pair of spaced apertures in the non-magnetic structure, so as to mount the ferromagnetic clip to the non-magnetic structure.

12. The vehicle trim component attachment system of claim 11, wherein a plurality of ferromagnetic clips are spaced along at least a header of the non-magnetic structure.

13. The vehicle trim component attachment system of claim 12, wherein the ferromagnetic clip is magnetic and oriented in reverse polarity with respect to the magnet, such that the ferromagnetic clips attract the magnets with sufficient force so as to secure the trim component to the non-magnetic body structure.

14. The vehicle trim component attachment system of claim 7, wherein the trim component is a headliner and the non-magnetic structure is a roof structure.

15. The vehicle trim component attachment system of claim 7, wherein the magnet is affixed to the exterior surface of the trim component with adhesive.

16. A vehicle headliner attachment system comprising:
    a non-magnetic roof structure having a header coupled with a side rail, each spanning along a portion of a vehicle structure, each comprising aluminum, and each including apertures spaced along a length thereof and extending through a bottom wall into a hollow interior thereof;
    a plurality of clips, each having a ferromagnetic planar body and a pair of opposing spring clips extending from terminal edges of the planar body along a longitudinal axis of the planar body, the spring clips operable along the longitudinal axis, wherein the spring clips secure within a corresponding pair of apertures and through the bottom wall;
    a headliner having an exterior surface; and
    a plurality of magnets affixed about the exterior surface that removably attach to the plurality of clips for mounting the headliner to the non-magnetic roof structure.

17. The vehicle headliner attachment system of claim 16, wherein the ferromagnetic planar body includes a first side abutting the non-magnetic roof structure and an opposite second side magnetically attaching to the magnet.

18. The vehicle headliner attachment system of claim 16, wherein the non-magnetic roof structure is made of aluminum.

* * * * *